United States Patent [19]
Rude

[11] Patent Number: 5,507,374
[45] Date of Patent: Apr. 16, 1996

[54] CLUTCH CONTROLLED ROLLER SHADE MECHANISM WITH INTEGRAL OVERRUNNING RATCHET

[75] Inventor: Edward T. Rude, Columbia, Md.

[73] Assignee: General Clutch Corporation, Stamford, Conn.

[21] Appl. No.: 290,400

[22] Filed: Aug. 15, 1994

[51] Int. Cl.⁶ ............................ E06B 9/56; F16D 13/08; F16D 49/04
[52] U.S. Cl. .................. 192/8 C; 160/292; 160/298; 160/321; 192/17 D; 192/41 S; 192/81 C
[58] Field of Search ................... 192/8 C, 17 D, 192/12 BA, 41 S, 81 C; 160/321, 291, 292, 298, 307, 308

[56] References Cited

U.S. PATENT DOCUMENTS

| | | |
|---|---|---|
| 2,976,976 | 3/1961 | Parker ..................... 192/41 S X |
| 3,135,369 | 6/1964 | Nisenson et al. . |
| 3,372,781 | 3/1968 | Fulton ...................... 192/41 S X |
| 4,372,432 | 2/1983 | Waine et al. . |
| 4,433,765 | 2/1984 | Rude et al. . |
| 4,729,418 | 3/1988 | Rude . |
| 4,865,109 | 9/1989 | Sherman .................... 160/321 |
| 5,361,822 | 11/1994 | Nijs ........................ 160/321 |
| 5,375,643 | 12/1994 | Rude ....................... 160/321 |

Primary Examiner—Rodney H. Bonck
Attorney, Agent, or Firm—Gottlieb, Rackman & Reisman

[57] ABSTRACT

A bi-directional sprang clutch further including a ratchet and pawl so as to permit substantial torque to be transmitted to the shade roller only in one direction. In the other direction, the roller is nearly free to rotate so that the weight of the shade material depending from one side of the roller exerts a torque on the roller which prevents reverse rolling.

26 Claims, 5 Drawing Sheets

CLUTCH CONTROLLED ROLLER SHADE MECHANISM WITH INTEGRAL OVERRUNNING RATCHET

BACKGROUND TO THE INVENTION

The vertical positioning roller shades is often controlled with a spring clutch mechanism. Such mechanisms are usually operated with a loop of cord or bead chain. A significant advantage of using loops to position shades is that it is not necessary to handle the shade material itself when operating the shade. This keeps the shade material much cleaner and, in the case of unsupported materials, prevents damage to the material.

However, with loop operated mechanisms it is possible to roll the material backwards onto the roller. This is undesirable in most cases, and in some cases it prevents the shade from working properly and can cause damage to the material. This is particularly true of multi-layered materials, many of which are damaged by reverse rolling.

Some rather awkward and complex systems have been devised to prevent shades from being rolled backwards. One prior art mechanism uses a roller having an intricate shape together with other parts to effect a stop which prevents the rotation of the roller past bottom in the reverse direction. A simple clutch mechanism has been needed to provided loop operation while preventing reverse rolling of the material.

BRIEF DESCRIPTION OF THE INVENTION

Our invention provides a bi-directional spring clutch in which the output torque is further controlled by a ratchet and pawl so as to permit substantial torque to be transmitted to the shade roller only in one direction. In the other direction, the roller is nearly free to rotate so that the weight of the shade material depending from one side of the roller exerts a torque on the roller which prevents reverse rolling. The bi-directional spring clutch is of the type shown in U.S. Pat. Nos. 4,372,432, and 4,433,765, and U.S. Pat. No. 5,373,643, with the addition of an inventive pawl as a connection between the clutch springs and the key by means of which the clutch housing is controlled.

In the preferred embodiment of our invention, the pawl is a plastic part made by injection molding. The pawl is designed to be flexible so as to provide the spring force for the operation of the ratcheting mechanism, thereby eliminating the need for a separate pawl spring.

Roller shades often require some small amount of torque in the reverse direction to start unwinding the shade from its fully rolled position. This is particularly true if the shade, when fully rolled onto its roller, comes into contact with any portion of a containment box, the window frame, the window itself, or a curtain. The spring rate of the pawl together with the ramp angle on the pawl are chosen so that friction between the pawl and the housing provides the desired amount of torque in the reverse direction.

The ratchet and pawl mechanism provide an additional advantage in that the mechanism produces a clicking sound when operation past the bottom position is attempted. This clicking sound alerts the user that the mechanism is not intended to drive the shade further in the same direction. The loudness of the clicking sound can be varied by adjustments to the spring rate and shape of the pawl, and the rate of the clicking can be varied by altering the number of keys which form the stops for the pawl.

Accordingly, it is an object of our invention to provide a mechanism for the operation of roller shades which has the benefits of cord operation and clutch control while preventing inadvertent reverse rolling of the shade material.

It is also an object of our invention to provide a mechanism for the control of roller shades that is capable of a large amount of torque in the forward direction and a small, but controlled, amount of torque in the reverse direction.

It is a further object of our invention to provide a shade operating mechanism that prevents inadvertent reverse rolling of the shade and which further provides an auditory signal to the user that when the shade has reached its bottom position, the mechanism is not to be operated further in that direction.

Other objects and advantages of our invention will become apparent from the descriptions that follow.

BRIEF DESCRIPTION OF THE DRAWINGS

Further understanding of our invention will become apparent upon consideration of the following detailed description in conjunction with the drawings, in which.

FIG. is a side elevation view of a spring clutch of the type under consideration.

DETAILED DESCRIPTION OF THE DRAWINGS

Figure 1:
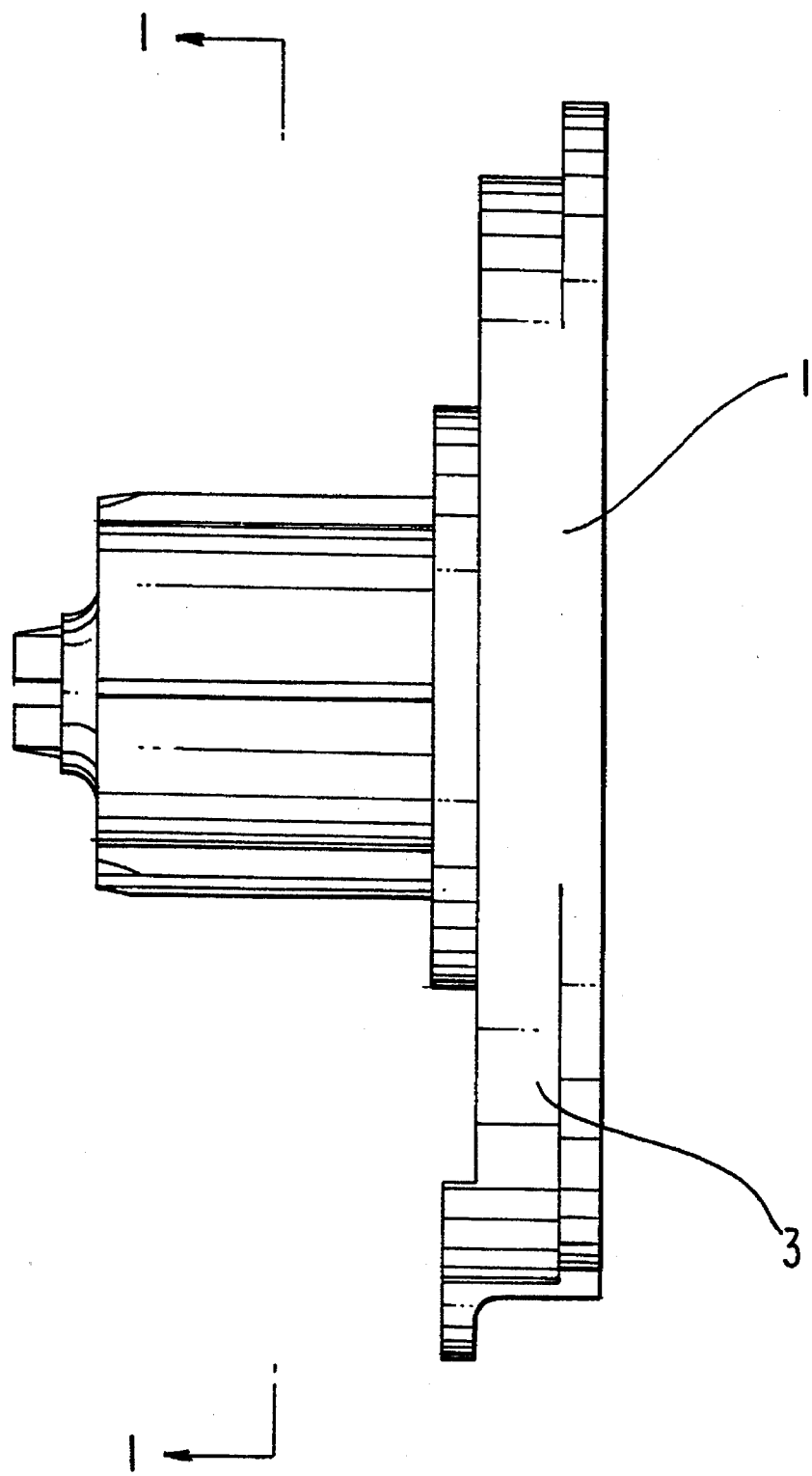
Figure 2:
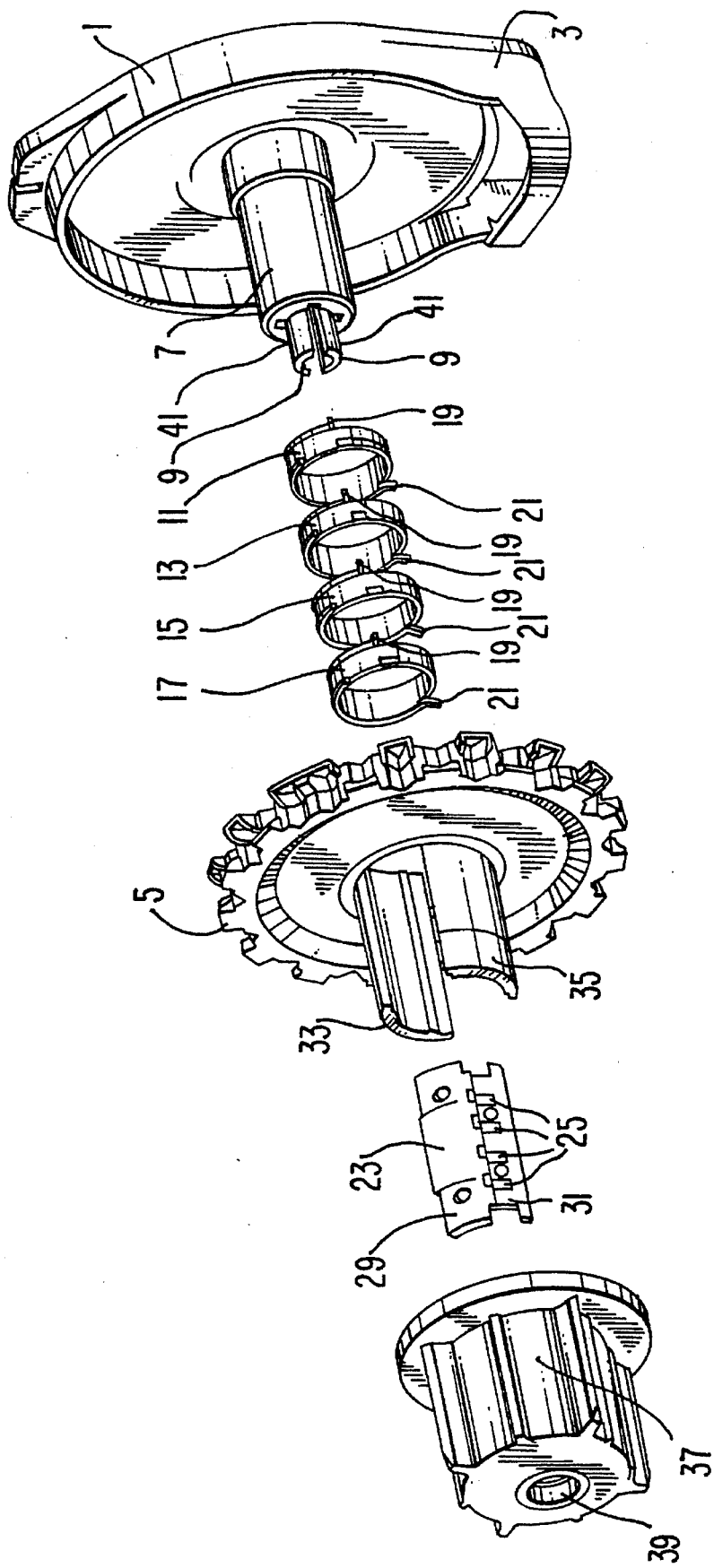
FIG. 2 is an exploded isometric view of the clutch of FIG. 1.

The construction of the clutch is generally like that of the clutch of U.S. Pat. No. 5,375,643. Referring now to FIGS. 1 and 2 coreguard 1 is generally comprised of guard portion 3 for guiding the operating cord or chain (not shown) about pulley 5, cylindrical core portion 7, and two retaining fingers 9. Each of four springs 11, 13, 15, and 17 have a free inside diameter slightly smaller than the outside diameter of cylindrical core portion 7. In assembly, the springs are slightly expanded and placed onto cylindrical portion 7 of coreguard 1. Each spring has two outwardly bent tangs 19 and 21. During assembly, the tangs are aligned as shown in FIG. 2.

Pawl 23 has a number of slots 25, equal to the number of springs. Pawl 23 is assembled onto the springs with tang 19 of each spring fitting into a slot 25 of pawl 23. While four springs are shown in this embodiment of our inventive clutch, other numbers can be used so long as the pawl has a slot to receive one tang of each spring.

Pulley 5 is then mounted to the assembly by sliding it over the springs and pawl 23. Coreguard 1 has shoulder which acts as a bearing surface for pulley 5, and as an axial restraint to keep the springs properly positioned with respect to pulley 5.

Figure 3:
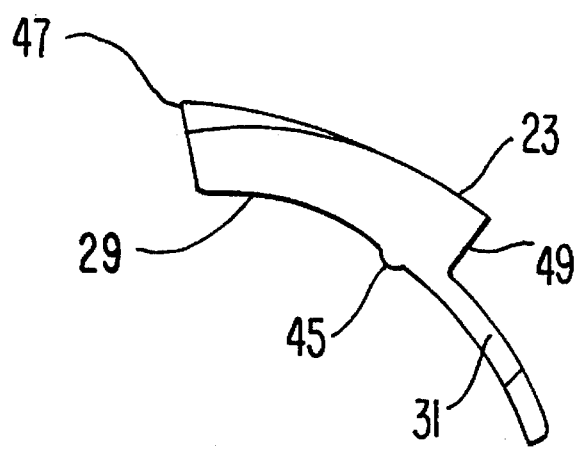
FIG. 3 is an end view of the pawl.

As seen best in FIG. 3, pawl 23 has thick portion 29, and thin portion 31. Slots 25 are in thin portion 31. Referring again to FIG. 2, pulley 5 has two control sectors, 33 and 35. When pulley 5 is assembled, control sectors 33 and 35 fit over the springs 11, 13, 15, and 17. Thin portion 31 of pawl 23 fits partially under control sector 35, while thick portion 29 fits into one of the arcuate openings between control sectors 33 and 35. Spring tangs 19 protrude through thin portion 31 of pawl 23, and fit into the opening between control sectors 33 and 35 along with thick portion 29. This opening is large enough so that there is some clearance for rotational movement of pulley 5 with respect to the other parts. The amount of clearance should be sufficient to permit perhaps 10 to 15 degrees of relative movement. The other tang, 21, of each spring, fits into the opposite arcuate opening between control sectors 33 and 35. Some care must be taken with the positioning of tangs 21 in this opening. This is discussed in the paragraph below which describe the operation of the clutch.

Assembly of the clutch is completed by fitting housing 37 onto the previously assembled parts. The entire assembly is held together by the action of barbs 41 of retaining fingers 9 of coreguard 1 which snap into hole 39 in the closed end of housing 37. Care must be taken to provide some slight amount of axial clearance in the fit of housing 37 onto coreguard 1. If there is no clearance, then the friction between those components may inhibit improper operation of the clutch.

Figure 4:
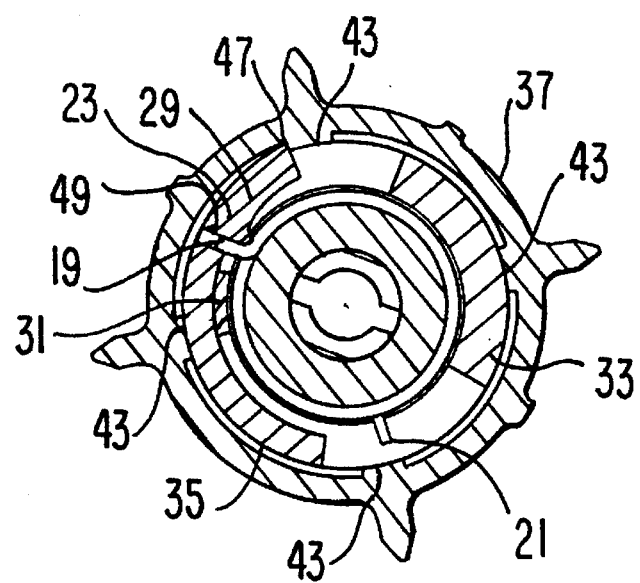
FIG. 4 is a cross-sectional view taken at 1—1 of the clutch of FIGS. 1 and 2, shown in the configuration for raising a shade.

Referring now to FIG. 4, it can be seen that housing 37 has four internal ridges, or keys 43. As best seen in FIG. 3, pawl 23 has ridge 45 which contacts the outside surface of the springs when assembled into the clutch as can be seen in FIG. 4. Still referring to FIG. 4, it can be seen that thin portion 31 of pawl 23 lies partially under control sector 35 of pulley 5. The pressure of control sector 35 on thin portion 31 of pawl 23 forces thick portion 29 of the pawl against the inside surface of housing 37. In FIG. 4 it can be seen that leading edge 47 of pawl 23 is in contact with one of keys 43.

Operation of our inventive clutch must be considered in three modes. In the first mode, a shade, which would be rolled about a roller into which housing 37 is irrotatably fitted, is being raised. In the second mode, the shade is being lowered. And in the third mode, the shade is fully lowered, and the user is attempting to continue movement of the clutch mechanism in the same direction. In this third mode, the clutch releases because of the ratcheting action of pawl 37 and keys 43 within housing 37.

The operating principles of our inventive clutch, insofar as it is a spring clutch, will be familiar to those skilled in the art of spring clutches. FIG. 4 shows the clutch in the first, raising mode. Clockwise rotation of pulley 5 results in clockwise rotation of control sectors 33 and 35. Control sector 35 contacts tangs 19 of springs 11, 13, 15, and 17 as well as edge 49 of pawl 23. This loosens the grip of the springs on core portion 7 of coreguard 1, allowing the springs and pawl 23 to follow the clockwise rotation of pulley 5. Leading edge 47 of pawl 23, wherever it begins, eventually comes into contact with one of keys 43, imparting the same clockwise rotation to housing 37 and to the shade which is caused to roll onto it's roller. Upon cessation of the rotation of pulley 5, the shade will remain in position provided its weight does not exceed the holding capacity of the clutch. The various elements will remain more or less as shown in FIG. 4 except that there will be a slight tightening of the springs about core 7, and therefore, a very slight counter-clockwise movement of housing 37 relative to the other internal parts. In a well designed clutch, this movement is almost imperceptible.

Figure 5:
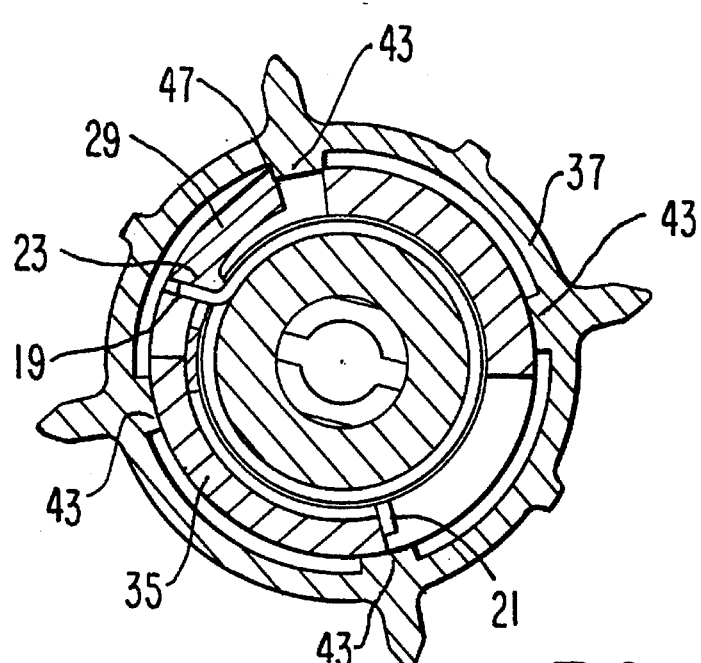
FIG. 5 is a cross-sectional view taken at 1—1 of the clutch of FIGS. 1 and 2, shown in the configuration for lowering a shade.

The second, or lowering mode, as shown in FIG. 5, control sector 35 has rotated in the counter-clockwise direction with respect to the other elements so that it has moved away from tangs 19, and come into contact with tangs 21 of the springs. In accordance with the well know operating principles of wrap spring devices, this causes the springs to loosen and rotate in the counterclockwise direction so long as control sector 35 continues to make contact with tangs 21 and move in that direction. While the shade is being lowered, the weight of the shade continues to be supported in the same way. Key 43 remains in contact with leading edge 47 of pawl 23 which is supported by tangs 19 of the springs. The springs rotate in the counter-clockwise direction only at the rate at which pulley 5 is rotated to release them.

Figure 6:
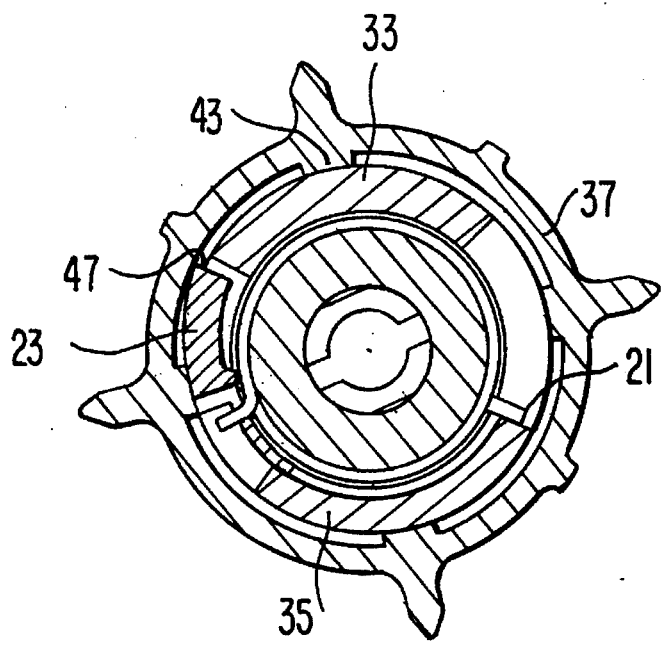
FIG. 6 is a cross-sectional view taken at 1—1 of the clutch of FIGS. 1 and 2, shown in the configuration that results when the rotation for lowering is continued beyond the fully lowered position.
Figure 7:
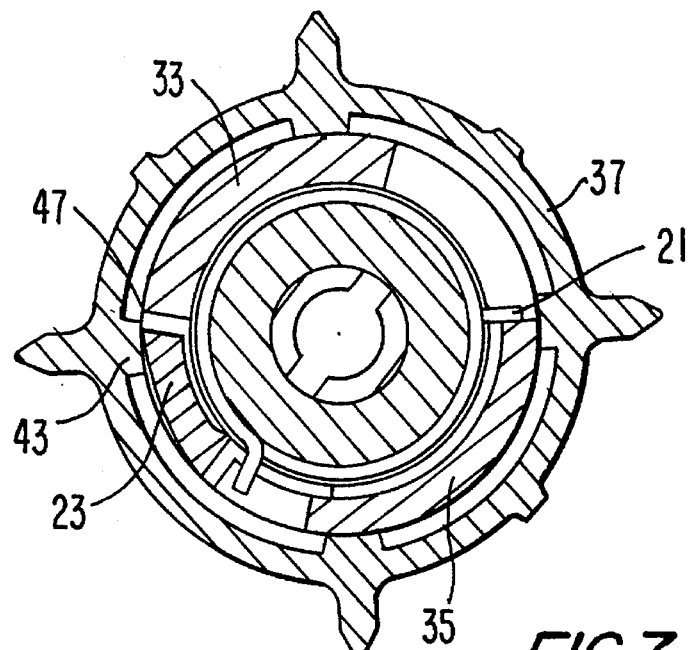
FIG. 7 is a cross-sectional view taken at 1—1 of the clutch of FIGS. 1 and 2, shown in configuration resulting from a further continuation of the lowering rotation.

When the shade is fully lowered, the user may simply cease pulling on the operating cord or chain leaving the shade at rest in that position. Alternatively, the operator may continue to pull, causing further rotation of pulley 5 in the counter-clockwise direction. As seen in FIG. 6, when this happens, housing 37 remains stationary, but pulley 5, pawl 23, and the springs continue to rotate in the counter-clockwise direction. As a result, leading edge 47 of pawl 23 moves away from key 43 with which it was in contact during raising and lowering of the shade. Continued counter-clockwise rotation eventually brings pawl 23 under one of keys 43. This forces thick portion 29 of pawl 23 to bend toward the center of the clutch as seen in FIG. 7. As leading edge 47 clears the key 43 under which it was passing, it snaps out against the interior surface of housing 37. This produces a click which serves to alert the operator that the mechanism has released. The number of clicks per revolution is determined by the number of keys 43 which are used. Four are shown only as an example.

The angle formed by the outside surface of thick portion 29 of pawl 23 is quite important. If the angle is steep, then in the reverse, counter-clockwise direction, more torque will be transmitted to the shade roller. This can be useful for assurance that the shade will begin lowering from the fully raised position even if there is some frictional contact between the shade and its surroundings. However, the larger angle and the resultant increased reverse torque also means that the shade, when fully lowered, will be driven slightly farther in the reverse direction before ratcheting begins. Our findings are that it best results are obtained when the deflection takes place as slowly as space permits. This produces minimal reverse torque which has been found to be satisfactory.

The spacing between the spring tangs must be in accordance with good design principles for wrap spring clutches. The spacing between tangs 19 and 21 must be such that when either is being contacted by control sector 35 of pulley 5, the other tangs are not contacted by sector 35.

Figure 8:
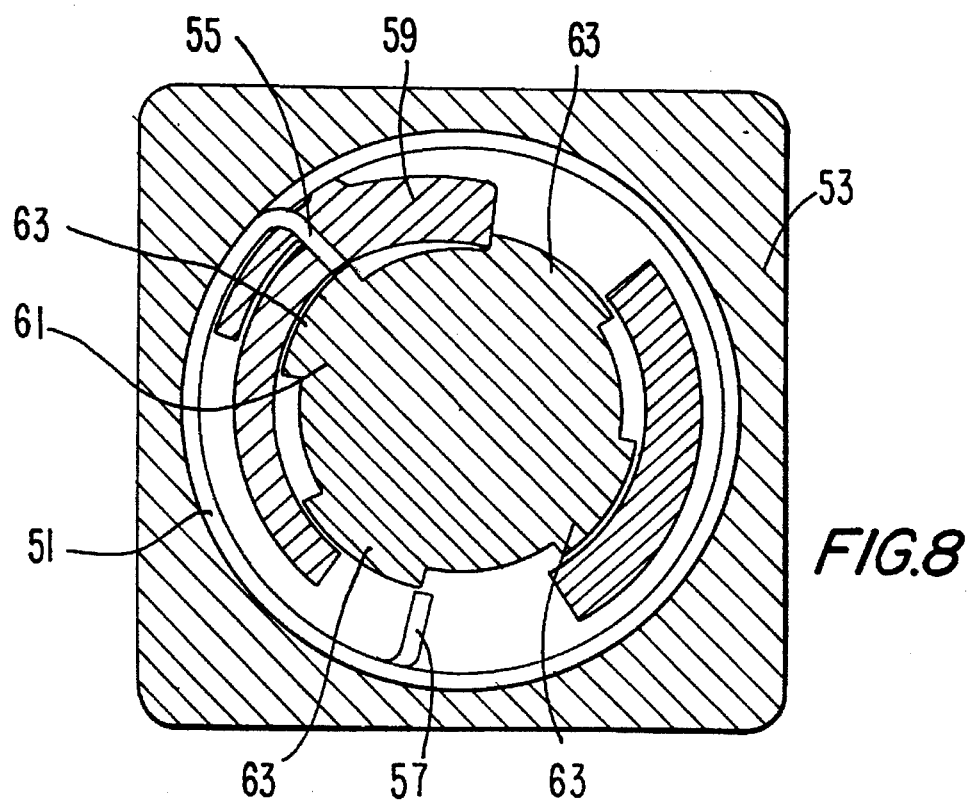
FIG. 8 shows another embodiment of our invention adapted for mounting of the exterior element.

FIG. 8 shows an alternative embodiment of our invention. In this embodiment, the spring or springs 51 are in frictional contact with the interior surface of housing 53. Spring tangs 55 and 57 bend inwardly, with tang 55 engaging pawl 59. Pawl 59, instead of riding on the outside of the springs, now rides on the outer surface of core 61. In the application of this embodiment to window coverings, core 61 would ordinarily be the element to which the load is attached, and housing 53 would be the stationary or mounted element.

The operation of this embodiment of our invention is analogous to the operation of the previous embodiment. In this case, ratcheting takes place by movement of pawl 59 over keys 63 of core 61, and driving takes place by the contact between the leading edge of pawl 59 with one of keys 63.

It will thus be seen that the objects set forth above among those made apparent from the preceding description, are efficiently attained and, since certain changes may be made in the construction of the inventive spring clutch without departing from the spirit and scope of the invention, it is intended that all matter contained in the above description or shown in the accompanying drawings shall be interpreted as illustrative and not in a limiting sense.

It Is also to be understood that the following claims are intended to cover all of the generic and specific features of the invention herein described and all statements of the scope of the invention which, as a matter of language, might be said to fall therebetween.

I claim:

1. A spring clutch assembly comprising:

a shaft;

at least one helically wound axially mounted spring for making frictional contact with the shaft;

engaging means for selectively applying a tightening force in only one direction to one end of said at least one spring for substantially preventing rotation of said at least one spring with respect to said shaft in said one direction;

an operating means concentrically mounted for rotation between said at least one spring and said engaging means; and means for substantially preventing the application of torque by said operating means to said engaging means in said one direction comprising a pawl member assembled onto said at least one spring.

2. The assembly of claim 1, wherein said operating means comprises a pulley member coaxially mounted with said at least one spring.

3. The assembly of claim 2, wherein said pawl member includes at least one slot for receiving a tang of said at least one spring.

4. The assembly of claim 3, wherein said pawl member includes a thickened portion and a thinned portion, and wherein said at least one slot is located in said thinned portion.

5. The assembly of claim 4, wherein said pulley member has a first control sector and a second control sector.

6. The assembly of claim 5, wherein said control sectors of the said pulley fit over said at least one spring.

7. The assembly of claim 6, wherein said thinned portion of said pawl member fits at least partially along said first control sector and said thickened portion of said pawl member fits along an arcuate opening between the said first control sector and said second control sector.

8. The assembly of claim 7, wherein said spring tang of said at least one spring fits into said opening between said first and second control sectors of said pulley.

9. The spring clutch of claim 2, further comprising a housing coaxially mounted about the shaft, said at least one spring located between the shaft and the housing.

10. The spring clutch of claim 9, wherein the housing includes said engaging means.

11. The spring clutch of claim 10, wherein said housing is rotatably mounted about the shaft.

12. The spring clutch of claim 11, wherein said tightening force is applied by relative rotational movement of the housing with respect to the shaft.

13. The spring clutch of claim 10, wherein said at least one spring is in selective operative engagement with the housing engaging means by means of said pawl during relative rotational movement of the housing with respect to the shaft.

14. The spring clutch of claim 13, wherein said at least one spring includes a tang element disposed in a slot in said pawl member.

15. The spring clutch of claim 14, wherein said housing includes at least one key for selectively contacting said pawl member during rotational movement of the housing with respect to the shaft.

16. The spring clutch of claim 2, further comprising a core coaxially mounted within the shaft, said at least one spring being located between the shaft and the core.

17. The spring clutch of claim 16, wherein said core includes said engaging means.

18. The spring clutch of claim 17, wherein said core is rotatably mounted within the shaft.

19. The spring clutch of claim 18, wherein said tightening force is applied by relative rotational movement of the core with respect to the shaft.

20. The spring clutch of claim 17, wherein said at least one spring is in selective operative engagement with the core engaging means by means of said pawl member during relative rotational movement of the core with respect to the shaft.

21. The spring clutch of claim 20, wherein said at least one spring includes a tang element disposed in a slot in said pawl member.

22. The spring clutch of claim 21, wherein said core includes at least one key for selectively contacting said pawl member during rotational movement of the core with respect to the shaft.

23. A spring clutch assembly comprising:

a shaft;

at least one helically wound axially mounted spring for making frictional contact with the shaft;

engaging means for selectively applying a tightening force in only one direction to one end of said at least one spring for substantially preventing rotation thereof with respect to said shaft in said one direction;

pulley means concentrically mounted for rotation between said at least one spring and said engaging means; and means for substantially preventing the application of torque by said pulley means to said engaging means in said one direction comprising a pawl member assembled onto said at least one spring;

wherein said at least one spring is in selective operative engagement with said engaging means by means of said pawl member during relative rotation movement of said engaging member with said shaft.

24. The spring clutch of claim 23, wherein said engaging means is located along a housing coaxially and rotatably mounted about said shaft.

25. The spring clutch of claim 24, wherein said at least one spring includes a tang element received in a slot in said pawl member.

26. The assembly of claim 25, wherein said housing includes at least one key for selectively contacting said pawl member during rotational movement of the housing with respect to the shaft.

* * * * *